US008980349B2

(12) United States Patent
Nielsen et al.

(10) Patent No.: US 8,980,349 B2
(45) Date of Patent: Mar. 17, 2015

(54) FOOD PRODUCT HAVING A CASING

(75) Inventors: Helge Henrik Nielsen, Helsinge (DK);
Nicola Jane Wells, Hampshire (GB)

(73) Assignee: FMC Corporation, Philadelphia, PA (US)

( * ) Notice: Subject to any disclaimer, the term of this patent is extended or adjusted under 35 U.S.C. 154(b) by 745 days.

(21) Appl. No.: 12/488,072

(22) Filed: Jun. 19, 2009

(65) Prior Publication Data

US 2009/0317522 A1    Dec. 24, 2009

(30) Foreign Application Priority Data

Jun. 20, 2008 (GB) .................................. 0811443.1

(51) Int. Cl.
| | | |
|---|---|---|
| *A23G 1/00* | (2006.01) | |
| *A23L 1/31* | (2006.01) | |
| *A23L 1/315* | (2006.01) | |
| *A21D 13/00* | (2006.01) | |
| *B65D 81/34* | (2006.01) | |
| *A23L 1/05* | (2006.01) | |
| *A23L 1/00* | (2006.01) | |
| *A22C 17/14* | (2006.01) | |

(Continued)

(52) U.S. Cl.
CPC ............. *A23L 1/0079* (2013.01); *A23L 1/0067* (2013.01); *A22C 13/0016* (2013.01); *A22C 17/14* (2013.01); *A21D 13/0025* (2013.01); *A22C 13/0013* (2013.01); *A21D 13/0029* (2013.01); *A22C 13/0003* (2013.01); *A22C 2013/0023* (2013.01); *A23L 1/0532* (2013.01); *A23L 1/3175* (2013.01)
USPC ............. 426/105; 426/57; 426/138; 426/276; 426/277; 426/575

(58) Field of Classification Search
CPC ............. A22C 3/0026; A22C 13/0013; A22C 13/0016; A22C 17/14; A22C 13/00; A21D 13/0029; A21D 13/0025; A23L 1/3185; A23L 1/3175; A23L 1/0067; A23L 1/0532; A23L 1/0079; A23C 17/14; A23C 13/0003
USPC ........................... 426/57, 105, 138, 276, 277
See application file for complete search history.

(56) References Cited

U.S. PATENT DOCUMENTS

| | | | |
|---|---|---|---|
| 2,802,744 A | | 8/1957 | Weingand |
| 4,347,261 A | * | 8/1982 | Challen et al. ................. 426/573 |

(Continued)

FOREIGN PATENT DOCUMENTS

| | | |
|---|---|---|
| EP | 0692194 A1 | 1/1996 |
| EP | 1042958 A1 | 10/2000 |

(Continued)

OTHER PUBLICATIONS

Solubility Product Constants. Available online at www.ktf-split.hr since Mar. 22, 2003.*

(Continued)

*Primary Examiner* — Rena L Dye
*Assistant Examiner* — Assaf Zilbering
(74) *Attorney, Agent, or Firm* — FMC Corporation

(57) ABSTRACT

The present invention is directed to a process for preparing a food product having a casing, the process comprising the step of applying a casing paste comprising alginate and a sparingly soluble calcium salt by co-extrusion to the exterior of a material to be cased to form a co-extruded product, and contacting the co-extruded product with a solution comprising calcium ions, thereby causing the alginate to gel.

12 Claims, 2 Drawing Sheets

(51) Int. Cl.
   *A23L 1/0532* (2006.01)
   *A23L 1/317* (2006.01)
   *A22C 13/00* (2006.01)

(56) References Cited

U.S. PATENT DOCUMENTS

| | | | |
|---|---|---|---|
| 5,356,654 A * | 10/1994 | Speirs et al. | 426/575 |
| 2003/0228372 A1 | 12/2003 | Hsu et al. | |
| 2004/0052900 A1 | 3/2004 | Le Paih | |
| 2004/0156977 A1 | 8/2004 | Bocabeille | |
| 2007/0154601 A1 | 7/2007 | Foegler et al. | |
| 2007/0160718 A1 | 7/2007 | Visser | |
| 2007/0160783 A1 | 7/2007 | Rieser et al. | |
| 2009/0061051 A1 | 3/2009 | Visser | |

FOREIGN PATENT DOCUMENTS

| | | |
|---|---|---|
| EP | 1311165 B1 | 11/2006 |
| FR | 2 821 245 A1 | 8/2002 |
| GB | 807863 | 1/1959 |
| GB | 2058539 A | 4/1981 |
| WO | WO 91/04674 | 4/1991 |
| WO | WO 92/03938 | 3/1992 |
| WO | WO 99/55165 | 11/1999 |
| WO | WO 00/44233 | 8/2000 |
| WO | WO 0215715 A1 * | 2/2002 |
| WO | WO 2009/145626 A1 | 12/2009 |

OTHER PUBLICATIONS

Merck Index. 14th Edition, Version 14.6 (Sep. 7, 2010).*
EPO Communication pursuant to Rule 114(2) EPC enclosing observations by a third party concerning the patentability of the invention in connection with the above referenced application—Dated Mar. 26, 2012.
Hultquist Letter Dated Jun. 13, 2014 (14 pages).
Vavrusova, et al, "Aqueous Solubility of Calcium L-Lactate, Calcium D-Gluconate, and Calcium D-Lactobionate: Importance of Complex Formation for Solubility Increase by Hydroxycarboxylate Mixtures," Journal of Agricultural and Food Chemistry, 2013, 61, 8207-8214 (8 pages).
Observations by a Third Party Under Art. 115 EPC Against European Patent Application No. 09 767 820.5, dated Sep. 5, 2014.

* cited by examiner

FOOD PRODUCT HAVING A CASING

FIELD OF THE INVENTION

This invention relates to a food product having a casing, to a process for preparing such food products, and to a composition for use in the process for preparing such food products.

BACKGROUND OF THE INVENTION

Food products having a casing can be manufactured, for example, by the co-extrusion of a casing material and a food dough, based for example on pork, beef, lamb, poultry, fish, fruit or other vegetables, through concentric pipes in a co-extruder so that, on exiting the co-extruder, the extruded food dough is covered by a thin film of the casing material. The casing material is then changed into a robust casing material by treatment with suitable chemicals. One known method involves the use of alginate-containing materials as the casing material, which is co-extruded around a food dough and then gelled in a calcium bath to form a robust casing. For example, GB807863 describes the co-extrusion of sausage meat and a solution containing alginate, to form a continuous length of sausage, which is then passed through a bath containing calcium chloride, which causes the alginate to gel.

EP1311165 describes a composition comprising 2-7 wt % alginate and galactomannans being co-extruded around a food product and then contacted with a gelling agent so as to gel the alginate to form an edible casing.

Although such known methods produce a strong casing, the casing can get weaker over time when the food products, for example sausages, are stored at refrigerator temperatures. One possible explanation for that weakening is that sodium ions and phosphate ions from the food dough migrate into the casing causing removal of the calcium ions from the alginate leading to the reversion of the calcium-alginate gel.

SUMMARY OF THE INVENTION

It is an object of the invention to provide an improved food product that mitigates the above-mentioned problem.

It is a further object of the invention to provide an improved process for making such food products.

It is a still further object of the invention to provide an improved alginate composition for use in the process for making the food products.

According to a first aspect of the invention there is provided a process for preparing a food product having a casing, the process comprising the step of applying a casing paste comprising alginate and a sparingly soluble calcium salt by co-extrusion to the exterior of a material to be cased to form a co-extruded product, and contacting the co-extruded product with a solution comprising calcium ions, thereby causing the alginate to gel.

Thus the invention provides a process for the manufacture of a food product having a casing in which there is a sparingly soluble calcium salt which acts as a source of calcium ions, which will help to counter the depletion of calcium ions in the casing and thus will preserve the calcium-alginate gel and will result in a casing that is less prone to weakening over time.

DETAILED DESCRIPTION OF THE INVENTION

When the calcium salt is described as sparingly soluble, it is meant that the calcium salt has a low solubility product. The solubility product is the product of the equilibrium molar concentrations of the ions in a saturated solution of a salt in water. The sparingly soluble calcium salt optionally has a solubility product at 25° C. of not more than $10^{-2}$, preferably not more than $10^{-3}$, more preferably not more than $10^{-4}$. The sparingly soluble calcium salt is optionally selected from the group consisting of calcium carbonate, calcium citrate, calcium oxide, calcium phosphate, calcium silicate, calcium sulphate, calcium sulphide, calcium tartrate and mixtures thereof. The sparingly soluble calcium salt is preferably calcium sulphate.

The term "casing paste" as used herein refers to any alginate containing composition comprising a sparingly soluble calcium salt which is suitable for applying to the exterior of a material to be cased in the method of the invention.

The casing paste may optionally additionally comprise a thickener to give the correct rheology for extrusion. The thickener is optionally selected from the group consisting of native starch, modified starch, cellulose gum, cellulose gel, guar gum, tara gum and xanthan gum, carrageenan, gum tragacanth and mixtures thereof.

The casing paste may additionally comprise a protein such as dairy protein, animal protein, vegetable protein and mixtures thereof. Such a protein may be used to modify the appearance and properties of the casing, both before and after cooking.

Furthermore, the casing paste may additionally comprise low molecular weight substances such as simple sugar monomers (e.g. dextrose) or oligomers (e.g. maltodextrin) in order to modify the appearance of the casing.

Preferably the process further comprises the step of preparing an alginate paste and mixing with the alginate paste a sparingly soluble calcium salt to form the casing paste.

The term "alginate paste" as used herein refers to a composition comprising alginate and water.

The alginate paste will typically be prepared by mixing one or more alginate containing materials with water, together with any other components such as a thickener. The thickener may optionally be mixed with the alginate containing materials prior to the mixing with water.

The casing paste is applied to the exterior of the material to be cased by co-extrusion. A typical co-extrusion apparatus might comprise an inner nozzle for the material to be cased and an outer nozzle for the casing paste. The inner nozzle is arranged within the outer nozzle. The nozzles may, for example, be concentric. In that case, the inner nozzle may, for example, be circular and the outer nozzle may, for example, be an annulus.

Suitable apparatus for the preparation of food products having a casing according to the method of the invention is already commercially available, as it may be used for the formation of co-extruded casings using pastes based on collagen. In order to strengthen collagen based casings, chemicals such as aldehydes, e.g. in the form of liquid smoke, are mixed into the collagen paste by in-line mixing just prior to the paste entering the co-extrusion head. Such an apparatus may also be used to strengthen alginate base casings according to the method of the invention. The apparatus used in the method of the invention may, for example, comprise:

a first reservoir containing a sparingly soluble calcium salt, a second reservoir containing an alginate paste, an in-line mixer downstream of the first and second reservoirs, an outer nozzle, downstream of the in-line mixer, an inner nozzle, arranged within the outer nozzle, and a means for contacting a product extruded through the nozzles with a solution comprising calcium ions, such that in operation the sparingly soluble calcium salt from the first reservoir is mixed in the in-line mixer with the alginate paste from the second reservoir to form a casing paste and the casing paste is subsequently extruded through the outer nozzle, with a material to be cased being extruded through the inner nozzle, to form a co-extruded product, and the co-extruded product is contacted with the solution comprising calcium ions, thereby causing the alginate to gel.

The alginate paste in the second reservoir may optionally additionally comprise a sequestrant.

The solution comprising calcium ions may, for example, be contained in a bath, through which the co-extruded product passes. The solution comprising calcium ions may alternatively, or additionally, be sprayed onto the co-extruded product. The solution should contain dissolved calcium ions in a concentration sufficient to gel the alginate within the desired time. The solution will typically comprise one or more soluble calcium salts. The solution comprising calcium ions may, for example, be a solution of calcium chloride.

It is important that no significant gelling of the alginate occurs before the casing paste is applied to the exterior of the material to be cased. Accordingly, it is desirable to limit the time that lapses between the mixing of the sparingly soluble calcium salt with the alginate paste to form the casing paste and the application of the casing paste to the exterior of the material to be cased. The time between the mixing of the sparingly soluble calcium salt and the alginate paste and the application of the casing paste may, for example, be not more than 20 minutes, preferably not more than 5 minutes, and more preferably not more than 2 minutes. The time between the mixing of the sparingly soluble calcium salt into the alginate paste and the application of the casing paste may be at least 5 seconds, and optionally at least 30 seconds. It is to be understood that the time between the application of the casing paste and the contacting of the product with the solution comprising calcium ions is preferably as short as practicable.

A sequestrant may also be used to help prevent the alginate from gelling before the casing paste is applied. A sequestrant is a chelating agent that has a high affinity for calcium. The sequestrant should have a greater affinity for calcium than the alginate does. Thus the sequestrant will prevent calcium-alginate gelling until the sequestrant has been saturated with calcium ions.

Therefore the casing paste may additionally comprise a sequestrant. The sequestrant may, for example, be selected from the group consisting of trisodium phosphate, tetrasodium pyrophosphate, sodium hexametaphosphate, sodium tripolyphosphate, sodium citrate, sodium carbonate, calcium disodium ethylene diamine tetra-acetate (EDTA), glucono delta-lactone, sodium gluconate, potassium gluconate, and mixtures thereof. Sodium phosphates are preferred sequestrants.

Optionally, the sparingly soluble calcium salt is dispersed in water prior to being mixed with the alginate paste. In that embodiment the alginate paste may optionally comprise a sequestrant.

The sparingly soluble calcium salt may alternatively be dispersed in a water-immiscible liquid prior to being mixed with the alginate paste. In that embodiment, a sequestrant may optionally be dispersed in the water-immiscible liquid, since the sparingly soluble calcium salt and the sequestrant will not dissolve in the water-immiscible liquid and the sparingly soluble calcium salt will therefore not be saturated with calcium ions prior to being mixed with the alginate paste. The slurry of the sparingly soluble calcium salt may optionally be stabilised, so that substantially no sedimentation occurs, by a suitable thickener such as guar gum. Once the sparingly soluble calcium salt and the sequestrant dispersed in the water-immiscible liquid have been mixed with the alginate paste, the sparingly soluble calcium salt and the sequestrant will migrate from the water-immiscible liquid into the alginate paste. Of course, the alginate paste may also optionally comprise a sequestrant when the sparingly soluble calcium salt is dispersed in a water-immiscible liquid.

The water immiscible liquid may, for example, be a vegetable oil.

The amount of sequestrant will depend on a number of factors including, but not necessarily limited to, the solubility product of the sparingly soluble calcium salt, the time between the mixing of the sparingly soluble calcium salt into the alginate paste and the application of the casing paste and the type of sequestrant used. If too little sequestrant is used then it may become saturated before application. If a large excess of sequestrant is used then it may deplete the sparingly soluble calcium salt leaving no additional calcium ions for the alginate. The concentration of the sequestrant in the casing paste is optionally at least 0.01 wt %, and preferably at least 0.1 wt %. The concentration of the sequestrant in the casing paste is optionally not more than 5 wt %, preferably not more than 2 wt % and more preferably not more than 0.5 wt %.

The alginate concentration in the casing paste is optionally at least 0.5 wt %, preferably at least 2 wt % and more preferably at least 3.5 wt %. The alginate concentration in the casing paste is optionally not more than 15 wt %, preferably not more than 10 wt % and more preferably not more than 7 wt %.

The concentration of sparingly soluble calcium salt, expressed as calcium sulphate, in the casing paste is optionally at least 0.1 wt %, and preferably at least 0.2 wt %. The concentration of sparingly soluble calcium salt, expressed as calcium sulphate, in the casing paste is optionally not more than 10 wt %, preferably not more than 4 wt % and more preferably not more than 1 wt %. The phrase "expressed as calcium sulphate" as used herein, means that the concentration of calcium ions is expressed as the weight percentage of calcium sulphate that would be required in the paste to provide all of those calcium ions. It will be understood that, whilst the values given above are expressed as calcium sulphate, any sparingly soluble calcium salt may be used in the invention.

According to a further aspect of the invention there is provided an alginate composition suitable for mixing with water to form an alginate paste suitable for extrusion, the composition comprising alginate, a thickener and a sequestrant.

The composition may optionally be a powder.

The composition may optionally be dry, that is it may have a moisture content not more than 15%.

The thickener may optionally be a cold-soluble thickener.

The thickener may, for example, be a galactomannan.

The thickener may, for example, be selected from the group consisting of native starch, modified starch, cellulose gum, cellulose gel, guar gum, tara gum and xanthan gum, carrageenan, gum tragacanth and mixtures thereof.

The sequestrant may, for example, be selected from the group consisting of trisodium phosphate, tetrasodium pyrophosphate, sodium hexametaphosphate, sodium tripolyphosphate, sodium citrate, sodium carbonate, calcium disodium ethylene diamine tetra-acetate (EDTA), glucono delta-lactone, sodium gluconate, potassium gluconate, and mixtures thereof.

The composition may optionally comprise not less than 20 wt % alginate, preferably not less than 30 wt % alginate and more preferably not less than 40 wt % alginate.

The composition may optionally comprise not more than 75 wt % alginate, preferably not more than 65 wt % alginate and more preferably not more than 60 wt % alginate.

The composition may additionally comprise proteins such as dairy proteins, animal proteins, vegetable proteins and mixtures thereof.

The composition may optionally comprise not more than 25 wt % sequestrant.

The composition may optionally comprise not less than 0.1 wt % sequestrant.

When the composition is described in terms of wt %, it is to be understood that refers to a weight percentage in terms of the composition before it is mixed with water to form an alginate paste.

When the alginate paste is described as "suitable for extrusion" it is meant that the paste has appropriate rheological properties, for example viscosity, to allow it to be co-extruded according to the method of the invention.

When the composition is described as "suitable for mixing with water to form an alginate paste" it meant that the composition can be mixed with water to form an alginate paste as defined herein. The composition may, for example, be mixed with water and a vegetable oil.

The alginate paste thus formed may, for example, be used in the process for preparing a food product having a casing described herein. The mixing of the composition with water to form an alginate paste may, for example, be one of the steps in such a process.

The dry matter content of the alginate paste may optionally be not less than 6 wt %, preferably not less than 7 wt % and more preferably not less than 8 wt %.

The dry matter content of the alginate paste may optionally be not more than 20 wt %, preferably not more than 15 wt % and more preferably not more than 10 wt %.

According to a further aspect of the invention there is provided a food product having a casing, the casing comprising gelled alginate and further comprising a sparingly soluble calcium salt.

The sparingly soluble calcium salt optionally has a solubility product at 25° C. of not more than $10^{-2}$, preferably not more than $10^{-3}$, more preferably not more than $10^{-4}$.

The sparingly soluble calcium salt is optionally selected from the group consisting of calcium carbonate, calcium citrate, calcium oxide, calcium phosphate, calcium silicate, calcium sulphate, calcium sulphide, calcium tartrate and mixtures thereof. The sparingly soluble calcium salt is preferably calcium sulphate.

Products made according to the invention may comprise a food dough in an edible casing. The food dough may be a meat product, for example it may be sausage meat. The food product may be a sausage. The food product may be a meat sausage, for example it may contain pork. The food product may be a vegetarian sausage. The food product may be cooked or uncooked. One skilled in the art will appreciate that these are just examples of possible products that could be made in accordance with the invention and that they do not limit the scope of the invention.

Any feature described herein in relation to one aspect of the invention may be applied to another aspect of the invention. For example, a feature of the food product may be applied as part of the process. It will be understood that any such combinations fall within the scope of the invention.

By way of example, certain embodiments of the invention will now be described with reference to the accompanying drawings, of which:

Figure 1:
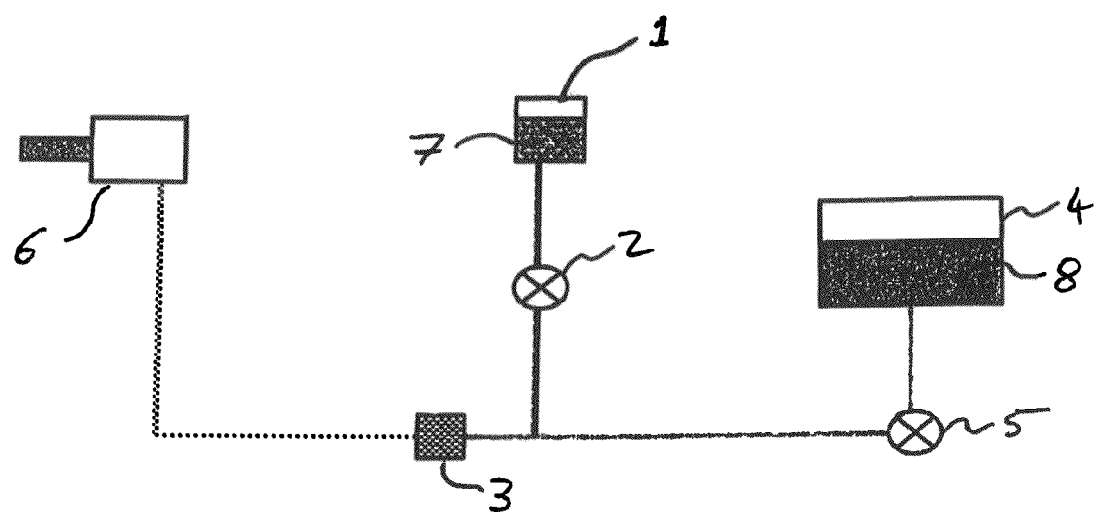
FIG. 1 is a diagram of an apparatus for preparing a casing paste.

In FIG. 1, a first reservoir 1 is connected, via a first pump 2 to an in-line mixer 3. A second reservoir 4 is also connected, via a second pump 5, to the in-line mixer 3, and the outlet of the in-line mixer 3 is connected, in this embodiment, to a co-extrusion head 6. In operation the first reservoir 1 contains a dispersion of sparingly soluble calcium salt 7 and the second reservoir 4 contains an alginate paste 8 made by mixing a dry powder composition comprising alginate, cold-soluble thickeners and a sequestrant with water. The dispersion of sparingly soluble calcium salt 7 and the alginate paste 8 are pumped through the in-line mixer, where they are mixed together to form a casing paste, which in this embodiment is delivered to the co-extrusion head 6. The dispersion of sparingly soluble calcium salt 7 is pumped by the first pump 2 and the alginate paste 8 is pumped by the second pump 5. By altering the flowrates the concentration of sparingly soluble calcium salt in the casing paste can be controlled.

Figure 2:
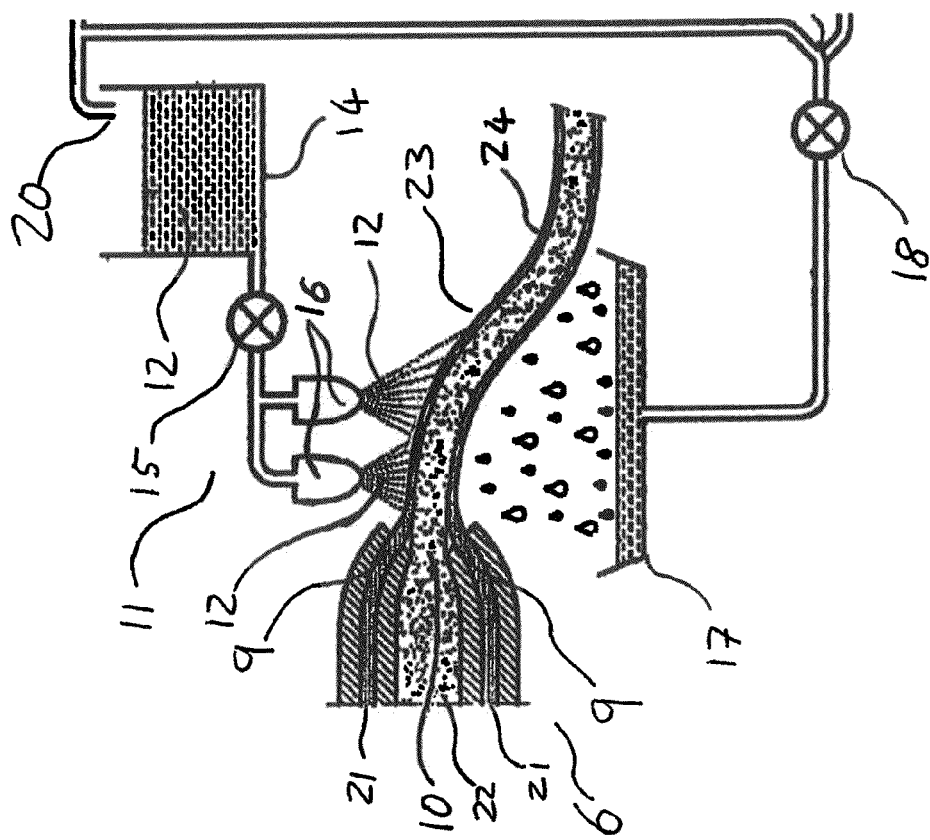
FIG. 2 is a diagram showing the application of a casing paste to a material to be cased.

In FIG. 2, a means for applying a casing paste 21 to a material to be cased 22 comprises a co-extrusion head 6, which comprises an outer nozzle 9 and an inner nozzle 10, arranged within the outer nozzle 9. Downstream of the co-extrusion head 6 there is a means 11 for contacting a co-extruded product 23 with a solution comprising calcium ions 12, the means 11 comprising a reservoir 14, the outlet 19 of which is connected via a pump 15 to sprayers 16, and further comprising a collection tray 17, which is connected via a pump 18 to an inlet 20 of the reservoir 14. A casing paste 21 comprising alginate and sparingly soluble calcium salt is extruded through the outer nozzle 9 and a food dough 22 is extruded through the inner nozzle 10 to form a co-extruded product 23, which passes under the sprayers 16 and contacts with the solution comprising calcium ions 12 being sprayed from the sprayers 16, thereby causing the alginate to gel to form a casing 24. Excess solution is collected in the collection tray 17 and recycled via the pump 18 to the reservoir 14.

EXAMPLES

Further embodiments of the invention will now be described by way of example.

Example A

A meat dough was prepared with the following composition:

| | |
|---|---|
| Pork Shoulder | 24.0% |
| Pork Belly | 46.8% |
| Water | 18.5% |
| Rusk | 5.0% |
| Soya isolate | 2.0% |
| Salt | 2.0% |
| Spices | 0.26% |
| Sodium Ascorbate | 0.04% |
| Sugar | 0.4% |
| Dextrose | 0.5% |
| Phosphates | 0.5% |
| Total | 100% |

The dough was prepared using the following steps:
Grind all the meats through a 4 mm plate.
Add ground meat-materials plus the water and the dry ingredients (without the rusk) to bowl-chopper.
Blend the mixture with the knives on low reversed speed for 2-3 minutes.
Add the rusk.
Bowl-chop one or two rounds with the knives at low speed.
Blend the mixture with the knives on low reversed speed for 2-3 of minutes.

A slurry of calcium sulphate di-hydrate and tetra sodium pyrophosphate was made in vegetable oil in the ratio 2 parts calcium sulphate di-hydrate: 1 part tetra sodium pyrophosphate: 3 parts vegetable oil by weight using a propeller stirrer.

A paste according to the preferred ranges of concentration described in the invention was made containing sodium alginate, sodium carboxymethyl cellulose, modified starch and dextrose. The dry matter content of the paste was 9.5%, and it was processed in the bowl chopper until the paste was smooth without lumps. Then the paste was de-aerated in a Stephan kettle for 30 minutes at min. 90% vacuum.

Sausages (length: 100 mm; diameter: 25 mm, weight: 50 grams) were produced using a commercial QX co-extruder machine from Stork Townsend B.V. (NL) using the following settings: Meat pump 18 rpm, paste pump: 50 rpm, in-line mixing: 1.5% slurry mixed into the paste. The level of casing on the sausages was 4.5%. The sausage string was initially sprayed with 7.5 wt % calcium chloride and passed afterwards through a bath of 7.5 wt % calcium chloride solution. The holding time was approximately 1 second.

Example B

A slurry of calcium sulphate di-hydrate and water was made in the ratio 1:2. Guar gum was added to a concentration of 0.5% in the slurry in order to stabilize the slurry.

A meat dough similar to the one described under example A was prepared, and a paste was prepared as described under example A containing sodium alginate, guar gum, modified starch, skimmed milk powder and sodium polyphosphate. Furthermore, vegetable oil was added to the water in the bowl chopper before adding the above powder blend. The vegetable oil caused the gel to become opaque and so more similar to the appearance of a natural casing.

Sausages (length: 100 mm; diameter: 25 mm, weight: 50 grams) were produced using a commercial QX co-extruder machine from Stork Townsend B.V. (NL) using the following settings: Meat pump 18 rpm, paste pump: 50 rpm, in-line mixing: 0.75%-4.5% of slurry mixed into the paste. The level of casing on the sausages was 5%. The sausage string was initially sprayed with 7.5 wt % calcium chloride and passed afterwards through a bath of 7.5 wt % calcium chloride solution. The holding time was approximately 1 second. The sausages could be kept for 2-3 weeks in a controlled atmosphere at 5° C. maintaining a satisfying strength of the casing.

What is claimed is:

1. A process for preparing a food product having a casing, the process comprising the step of applying a casing paste comprising alginate, a sparingly soluble calcium salt and a sequestrant by co-extrusion to the exterior of a material to be cased to form a co-extruded product, and contacting the co-extruded product with a solution comprising calcium ions, thereby causing the alginate to gel; the sparingly soluble calcium salt has a solubility product at 25° C. in water of not more than $10^{-3}$, wherein said food product is uncooked sausage.

2. The process of claim 1, in which the sparingly soluble calcium salt is selected from the group consisting of calcium carbonate, calcium citrate, calcium oxide, calcium phosphate, calcium silicate, calcium sulphate, calcium sulphide, calcium tartrate and mixtures thereof.

3. The process of any preceding claim, in which the concentration of sparingly soluble calcium salt, expressed as calcium sulphate, in the casing paste is in the range 0.1 wt % to 10 wt %.

4. The process of claim 3, in which the time between the mixing of the sparingly soluble calcium salt and the alginate paste and the application of the casing paste is not more than 20 minutes.

5. The process of claim 1, wherein said sausage comprises meat.

6. The process of claim 1, wherein said sausage is vegetarian.

7. The process of claim 1 wherein the sparingly soluble calcium salt has a solubility product at 25°C. in water of not more than $10^{-4}$.

8. The process of claim 4, in which the time between the mixing of the sparingly soluble calcium salt and the alginate paste and the application of the casing paste is not more than 5 minutes.

9. The process of claim 3, wherein the sequestrant is present in an amount of at least 0.01 to 0.5 wt % of the casing paste, and the alginate is present in an amount of from 2 to 10 wt % of the casing paste.

10. The process of claim 1, wherein said casing paste further comprises a thickener.

11. The process of claim 10, wherein said thickener comprises a galactomannan.

12. The process of claim 10, wherein said thickener comprises at least one native starch, modified starch, cellulose gum, cellulose gel, guar gum, tara gum, xanthan gum, carrageenan, and gum tragacanth.

* * * * *